United States Patent [19]
Fitterman et al.

[11] Patent Number: 5,981,153
[45] Date of Patent: Nov. 9, 1999

[54] OPAQUE DEVELOPING COMPOSITION AND ITS USE TO PROCESS ROOMLIGHT HANDLEABLE BLACK-AND-WHITE PHOTOGRAPHIC ELEMENTS

[75] Inventors: Alan S. Fitterman, Rochester; Robert E. Dickerson, Hamlin, both of N.Y.

[73] Assignee: Eastman Kodak Company, Rochester, N.Y.

[21] Appl. No.: 09/205,902

[22] Filed: Dec. 4, 1998

Related U.S. Application Data

[62] Division of application No. 09/046,447, Mar. 23, 1998.

[51] Int. Cl.$^6$ .................................................... G03C 5/305
[52] U.S. Cl. .......................... 430/486; 430/487; 430/489; 430/497
[58] Field of Search .................................. 430/486, 487, 430/489

[56] References Cited

U.S. PATENT DOCUMENTS

| | | | |
|---|---|---|---|
| 3,630,744 | 12/1971 | Thiers et al. | 430/602 |
| 4,216,285 | 8/1980 | Miller | 430/140 |
| 4,471,047 | 9/1984 | Mattes et al. | 430/486 |
| 4,803,150 | 2/1989 | Dickerson et al. | 430/502 |
| 4,954,425 | 9/1990 | Iwano | 430/373 |

*Primary Examiner*—Hoa Van Le
*Attorney, Agent, or Firm*—J. Lanny Tucker

[57] ABSTRACT

Black-and-white elements, such as radiographic films, can be processed in roomlight because the developing composition includes a particulate opacifying agent, such as carbon black. Processing is carried out by processing the exposed element using a two-stage process in the same processing container. In the first stage, development is initiated with an opaque developing composition having a pH of from about 10 to about 12.5, and comprising an appropriate black-and-white developing agent in a concentration of from about 0.1 to about 0.5 mol/l, opacifying agent, and a sulfite at from about 0.1 to about 0.7 mol/l. After an appropriate time, a fixing agent (other than a sulfite) is introduced into the processing container to begin simultaneous development and fixing. The entire process in quite rapid, that is less than 90 seconds.

24 Claims, No Drawings

OPAQUE DEVELOPING COMPOSITION AND ITS USE TO PROCESS ROOMLIGHT HANDLEABLE BLACK-AND-WHITE PHOTOGRAPHIC ELEMENTS

CROSS REFERENCE TO RELATED APPLICATION

Divisional of prior application No. 09/046,447 filed Mar. 23, 1998.

RELATED APPLICATION

Copending and commonly assigned U.S. Ser. No. 09/046,449 filed on even date herewith, by Dickerson and Fitterman, and entitled OPAQUE. DEVELOPING/FIXING MONOBATH AND ITS USE FOR PROCESSING ROOM-LIGHT HANDLEABLE BLACK-AND-WHITE PHOTO-GRAPHIC ELEMENTS (Attorney Docket 77658/JLT).

FIELD OF THE INVENTION

This invention relates in general to photography and in particular to an improved method for roomlight processing of black-and-white photographic elements. More particularly, it relates to a method of roomlight processing of black-and-white radiographic films using a two-stage development and development/fixing sequence of steps, and to an opaque developing composition and processing kit useful therein.

BACKGROUND OF THE INVENTION

Roentgen discovered X-radiation by the inadvertent exposure of a silver halide photographic element. In 1913, Eastman Kodak Company introduced its first product specifically intended to be exposed by X-radiation (X-rays). Silver halide radiographic films account for the overwhelming majority of medical diagnostic images. It was recognized almost immediately that the high energy ionizing X-rays are potentially harmful, and ways were sought to avoid high levels of patient exposure. Radiographic films provide viewable silver images upon imagewise exposure followed by rapid access processing.

One approach, still in wide-spread use is to coat the silver halide emulsions useful in radiographic films on both sides of the film support. Thus, the number of X-rays that can be absorbed and used for imaging are doubled, providing higher sensitivity. Dual-coated radiographic films are sold by Eastman Kodak Company as DUPLITIZED films. Films that rely entirely upon X-radiation absorption for image capture are referred to in the art as "direct" radiographic films while those that rely on intensifying screen light emission are referred to as "indirect" radiographic films. Because the silver halide emulsions are used to capture the X-rays directly, the coating coverages of such emulsions are generally higher than in other radiographic elements. A typical coverage is about 5 g of silver/m$^2$ per side of DUPLITIZED films, and twice that amount for single-side coated films.

Other radiographic films are considered "indirect" because they are used in combination with phosphor-containing X-ray intensifying screens that absorb the X-rays, and then emit light that exposes the silver halide grains in the emulsion layers.

In addition to the two broad categories noted above, there is a third category of radiographic films, most commonly used for dental intra-oral diagnostic imaging and hereafter referred to as dental films. Intra-oral dental imaging presents obvious barriers to the use of intensifying screens. Thus, dental films utilize the coated silver halide to absorb X-rays, and are therefore a form of "direct" radiographic films.

There are other applications for direct radiographic films, such as in various industrial applications where X-rays are captured in imaging, but intensifying screens cannot be used for some reason.

U.S. Pat. No. 5,370,977 (Zietlow) describes dental films having improved characteristics and containing certain tabular grain silver halide emulsions. No spectral sensitization is used in such dental films, but in order to avoid fogging the films with inadvertent light exposure, the emulsions contain what is identified as a "desensitizer" that reduces emulsion sensitivity to light. Conventional processing solutions and conditions are described for these dental films.

Other desensitizing compounds for radiographic films are described in U.S. Pat. No. 3,630,744 (Thiers et al) for reducing film sensitivity to roomlight and UV radiation. Conventional processing of these films is also described.

It is the prevailing practice to process direct radiographic films for more than 3 minutes because of higher silver coverage. Such processes typically include black-and-white development, fixing, washing and drying. Films processed in this manner are then ready for viewing.

Photographic developing solutions containing a silver halide developing agent are well known in the photographic art for reducing silver halide grains containing a latent image to yield a developed photographic image. Many useful developing agents are known in the art, with hydroquinone and similar dihydroxybenzene compounds and ascorbic acid (and derivatives) being some of the most common. Such solutions generally contain other components such as sulfites as antioxidants, buffers, antifoggants, halides and hardeners. A workable pH for such solutions is usually in the range of from about 10 to about 11, depending upon the developing agent and other solution components.

Fixing solutions for radiographic films are also well known and include one or more fixing agents, of which thiosulfates are most common. Such solutions also generally include sulfites as antioxidants, and hardeners (such as aluminum salts), and a buffer (such as acetate), and have a functional pH range of from about 4 to about 5.5.

"Monobath" solutions are also known in the art of photographic chemical processing. Such solutions generally require long processing times and contain chemical components common to black-and-white developing and fixing solutions. They also typically have an alkaline pH and contain a sulfite.

Double-coated indirect radiographic elements described in U.S. Pat. No. 4,803,150 (Dickerson et al) contain certain microcrystalline particulate dyes that reduce "crossover". These elements are designed for use with intensifying screens. Crossover occurs when some light emitted by the screen passes through the film support and exposes silver halide grains on the opposite side, resulting in reduced image sharpness. The noted particulate dyes absorb unwanted actinic radiation, but are decolorized during conventional processing. Thus, a pH 10 developing solution is described for its conventional use as well as to decolorize the dyes within 90 seconds. Conventional fixing and washing follow.

Using conventional processing technology, such particulate dyes that allow roomlight handling would be rendered ineffective, since the development step is carried out at high pH in the presence of a sulfite. Thus, in a conventional multi-step process, the processed films cannot be handled in roomlight between the developing and fixing steps. Conventional "monobath" solutions do not allow for sufficient development since both exposed and unexposed silver halide is indiscriminately removed by the fixing agents, especially at the long processing times employed with these solutions.

Direct radiographic films, including dental films, thus have some sensitivity to roomlight and UV as well as X-rays, and therefore care must be taken to avoid inadvertent room-light exposure before and during processing. There has been a desire for radiographic films that are less sensitive to roomlight, and that can be handled and processed without the need for a darkroom or other special conditions. Such films would have a number of useful applications, such as dental and industrial imaging. However, conventional processing solutions and methods cannot be used to provide suitable radiographic images in such films.

Copending U.S. Ser. No. 08/956,305, filed Oct. 22, 1997, describes the use of separate developing and fixing compositions for processing roomlight handleable films, including radiographic dental films in sequential processing steps. While those compositions represent an advance in the art, they must be separately balanced in pH in relation to each other so that the light protecting dyes and desensitizers are not deactivated prematurely.

Using current processing technology, the dyes that allow roomlight handling would be rendered ineffective, since the development step is carried out at a high pH in the presence of sulfite ions. Thus, in a conventional multi-step process, the films could be handled in roomlight between the development and fixing steps. Conventional monobath processing solutions do not allow for sufficient development, since exposed and unexposed silver halide is indiscriminately removed by fixing agents, especially at the long processing times employed using those solutions.

In U.S. Ser. No. 08/970,869, filed Nov. 14, 1997, by Fitterman et al, processing of roomlight handleable photographic elements is described whereby two-stage processing (development and development/fixing) is carried out in a single light and fluid-tight processing container. Thus, while the elements can be handled in roomlight, they must be processed in the dark.

Therefore, a technology is needed whereby the noted black-and-white photographic elements can be both handled and processed in roomlight.

SUMMARY OF THE INVENTION

The present invention provides an advance in the art over known processing compositions and methods with a black-and-white developing composition comprising:

from about 0.1 to about 0.5 mol/l of a black-and-white developing agent, at least 0.5 weight % of a particulate opacifying agent, and from about 0.1 to about 0.7 mol/l of a sulfite.

This invention also provides a method for providing a black-and-white image comprising:

A) in a processing container, processing an imagewise exposed black-and-white photographic silver halide element with the black-and-white developing composition described above, and B) within less than 20 seconds after the beginning of step A, introducing into the processing container, a fixing composition comprising from about 0.2 to about 4 mol/l of a fixing agent other than a sulfite, and continuing processing for up to an additional 40 seconds, whereby the total time for the method is less than 90 seconds, the element comprising a support having thereon one or more layers, at least one of the layers being a silver halide emulsion layer.

In preferred embodiments, the element further comprises:

in one of the layers, a microcrystalline particulate dye that absorbs electromagnetic radiation in the visible and UV portions of the spectrum and is decolorized during step B, and in each silver halide emulsion layer, a desensitizer that reduces sensitivity of the silver halide emulsion layer to electromagnetic radiation in the visible portion of the spectrum by trapping electrons generated by exposure to that electromagnetic radiation.

Further, this invention provides a processing kit useful for carrying out the described processing method. This kit includes the black-and-white developing composition described above, and any one of the following components:

a fixing composition comprising a fixing agent other than a sulfite, the photographic element described above, or a processing container for carrying out the method.

The present invention provides a means for quickly processing radiographic elements in roomlight in a single processing container. Such films and processing would find considerable advantage for dental applications as well as some industrial uses. In preferred embodiments, the elements are direct radiographic films having a silver halide emulsion layer on both sides of the film support.

The films are processed using a unique two-stage development process in the processing container whereby solely development is carried out in the first stage for up to 20 seconds, but upon addition of a suitable fixing agent (other than a sulfite) to the developing composition, development is continued simultaneously with fixing in a second stage for up to 40 seconds. Thus, both stages are carried out in the same processing container, providing a simplified process, and avoiding the need for separate development, and fixing in separate containers or baths.

The films can still be processed in normal roomlight in the processing container since the particulate opacifying agent provides safelight protection. Thus, the processing container need not be light-tight. By allowing development to be initiated in the first stage prior to fixing, better sensitometric results can be obtained compared to the use of conventional monobath solutions.

Additional advantages are achieved by a unique combination of processed element composition that renders the element roomnlight handleable. First of all, preferred processed element contains a particulate dye that is sensitive to visible and UV radiation, but not to X-rays. These dyes enable roomlight handleability, but they are then decolorized during processing in the first and second stages because of the presence of the fixing agent and sulfite. In addition, further light protection is provided in the element by the presence of a silver halide desensitizer to trap electrons released by photo-exposure, but which dyes obviously are not affected by X-rays. The opacifying agent from the developing composition is present and useful in both stages, allowing roomlight processing in both stages.

The second stage is carried out using a combined developing/fixing composition that is designed with a specific pH and sulfite concentration to complete deactivation or decolorization of the particulate dye while both development and silver removal occur. Thus, the solutions used in the two stages must have pH within a specific range, and comprise specific levels of black-and-white developing agent, particulate opacifying agent, fixing agent and sulfite antioxidant to achieve all of the desired results.

In preferred embodiments, an acidic final washing solution is used after the combined development and fixing step to stop further development and to remove fixing agent.

DETAILED DESCRIPTION OF THE INVENTION

The present invention is useful for providing a black-and-white image in a photographic silver halide element, and preferably a radiographic film (such as a dental film). Other types of elements that can be processed using the present invention include, but are not limited to, aerial films, black-and-white motion picture films, duplicating and copy films, and amateur and professional continuous tone black-and-white films. The composition of such materials are well known in the art but the specific features that make preferred elements roomlight handleable are described below in more detail.

The black-and-white developing composition useful in the practice of this invention contains one or more black-and-white developing agents, including dihydroxybenzene and derivatives thereof, and ascorbic acid and derivatives thereof.

Dihydroxybenzene and similar developing agents include hydroquinone and other derivatives readily apparent to those skilled in the art (see for example, U.S. Pat. No. 4,269,929 of Nothnagle and U.S. Pat. No. 5,457,011 of Lehr et al). Hydroquinone is preferred.

Ascorbic acid developing agents are described in a considerable number of publications in photographic processes, including U.S. Pat. No. 5,236,816 (Purol et al) and references cited therein. Useful ascorbic acid developing agents include ascorbic acid and the analogues, isomers and derivatives thereof. Such compounds include, but are not limited to, D- or L-ascorbic acid, sugar-type derivatives thereof (such as sorboascorbic acid, γ-lactoascorbic acid, 6-desoxy-L-ascorbic acid, L-rhamnoascorbic acid, imino-6-desoxy-L-ascorbic acid, glucoascorbic acid, fucoascorbic acid, gluco-heptoascorbic acid, maltoascorbic acid, L-arabosascorbic acid), sodium ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid, as described for example in U.S. Pat. No. 5,498,511 (Yamashita et al), EP-A-0 585 792 (published Mar. 9, 1994), EP-A-0 573 700 (published Dec. 15, 1993), EP-A-0 588 408 (published Mar. 23, 1994), WO 95/00881 (published Jan. 5, 1995), U.S. Pat. No. 5,089,819 and U.S. Pat. No. 5,278,035 (both of Knapp), U.S. Pat. No. 5,384,232 (Bishop et al), U.S. Pat. No. 5,376,510 (Parker et al), Japanese Kokai 7-56286 (published Mar. 3, 1995), U.S. Pat. No. 2,688,549 (James et al), U.S. Pat. No. 5,236,816 (noted above) and *Research Disclosure*, publication 37152, March 1995. D-, L-, or D,L-ascorbic acid (and alkali metal salts thereof).or isoascorbic acid (or alkali metal salts thereof) are preferred. Sodium ascorbate and sodium isoascorbate are most preferred. Mixtures of these developing agents can be used if desired.

The developing composition can also preferably include one or more auxiliary co-developing agents, which are also well known (e.g., Mason, *Photographic Processing Chemistry*, Focal Press, London, 1975). Any auxiliary developing agent can be used, but the 3-pyrazolidone developing agents are preferred (also known as "phenidone" type developing agents). Such compounds are described, for example, in U.S. Pat. No. 5,236,816 (noted above). The most commonly used compounds of this class are 1-phenyl-3-pyrazolidone, 1-phenyl-4,4-dimethyl-3-pyrazolidone, 4-hydroxymethyl-4-methfyl-1-phenyl-3-pyrazolidone, 5-phenyl-3-pyrazolidone, 1-p-aminophenyl-4,4-dimethyl-3-pyrazolidone, 1-p-tolyl-4,4-dimethyl-3-pyrazolidone, 1-p-tolyl-4hydroxymethyl-4-methyl-3-pyrazolidone, and 1-phenyl-4,4-dihydroxymethyl-3-pyrazolidone. Other useful co-developing agents comprise one or more solubilizing groups, such as sulfo, carboxy or hydroxy groups attached to aliphatic chains or aromatic rings, and preferably attached to the hydroxymethyl function of a pyrazolidone, as described for example, in commonly assigned and copending U.S. Ser. No. 08/694,792 filed Aug. 9, 1996, by Roussihle et al. A most preferred co-developing agent is 4-hydroxymethyl-4-methyl-1-phenyl-3-pyrazolidone.

Less preferred auxiliary co-developing agents include aminophenols such as p-aminophenol, o-aminophenol, N-methylaminophenol, 2,4-diaminophenol hydrochloride, N-(4-hydroxyphenyl)glycinc, p-benzylaminophenol hydrochloride, 2,4-diamino-6-methylphenol, 2,4-diaminoresorcinol and N-(β-hydroxyethyl)-p-aminophenol.

A mixture of different types of auxiliary developing agents can also be used if desired.

An organic antifoggant is also preferably in the developing composition, either singly or in admixture. Such compounds control the gross fog appearance in the processed elements. Suitable antifoggants include, butare not limited to, benzimidazoles, benzotriazoles, mercaptotetrazoles, indazoles and mercaptothiadiazoles. Representative antifoggants include 5-nitroindazole, 5-p-nitrobenzoylaminoimidazole, 1-methyl-5-nitroindazole, 6-nitroindazole, 3-methyl-5-nitroindazole, 5-nitrobenzimidazole, 2-isopropyl-5-nitrobenzimidazole, 5-nitrobenzotriazole, sodium 4-(2-mercapto-1,3,4-thiadiazol-2-yl-thio)butanesulfonate, 5-amino-1,3,4-thiadiazol-2-thiol, 5-methylbenzotriazole, benzotriazole and 1-phenyl-5-mercaptotetrazole. Benzotriazole is most preferred.

The developing composition also includes one or more sulfite preservatives or antioxidants. A "sulfite" preservative is used herein to mean any sulfur compound that is capable of forming or providing sulfite ions in aqueous alkaline solution. Examples include, but are not limited to, alkali metal sulfites, alkali metal bisulfites, alkali metal metabisulfites, amine sulfur dioxide complexes, sulfurous acid and carbonyl-bisulfite adducts. Mixtures of these materials can also be used. Examples of preferred sulfites include sodium sulfite, potassium sulfite, lithium sulfite, sodium bisulfite, potassium bisulfite, sodium metabisulfite, potassium metabisulfite and lithium metabisulfite. Useful carbonyl-bisulfite adducts include alkali metal or amine bisulfite adducts of aldehydes and bisulfite adducts of ketones, such as sodium formaldehyde bisulfite, sodium acetaldehyde bisulfite, succinaldehyde bis-sodium bisulfite, sodium acetone bisulflite, β-methyl glutaraldehyde bis-sodium bisulfite, sodium butanone bisulfite, and 2,4-pentandione bis-sodium bisulfite.

Various known buffers, such as carbonates and phosphates, can be included in the aqueous form of the developing composition to maintain the desired pH to from about 10 to about 12.5, if desired. The pH of the developing composition is preferably from about 10.5 to about 12, and more preferably from about 11 to about 12. When the fixing agent is added (see below), the pH may drop slightly.

It is essential that the developing composition also include one or more particulate opacifying agents, meaning one or more particulate compounds that are dispersible in the aqueous form of the composition that will absorb essentially all radiation in the UV and visible portions of the electromagnetic spectrum. Carbon black is a preferred particulate opacifying agent. Other particulate pigments or dyes, or mixtures thereof, can be formulated to provide the same effect. Once the absorption spectra of such pigments and dyes are known, a skilled artisan could fashion a combination of compounds (dyes, pigments or both) that would absorb over the entire spectral range. Examples of useful particulate opacifying agents, other than carbon black, would be readily apparent to one skilled in the art. Various metal oxides would be useful as long as they are inert to the various chemical components used in the processing method. Dispersions of suitable particulate opacifying agents can be obtained commercially, or readily prepared by one skilled in the art using water or mixture of water and water-miscible solvents (such as alcohols) as the dispersion medium. Small amounts of surfactants may be used to aid in forming the dispersions.

It is optional for the developing composition to contain one or more sequestering agents that typically function to form stable complexes with free metal ions (such as silver ions) in solution, in conventional amounts. Many useful sequestering agents are known in the art, but particularly useful classes of compounds include, but are not limited to, multimeric carboxylic acids as described in U.S. Pat. No. 5,389,502 (Fitterman et al), aminopolycarboxylic acids, polyphosphate ligands, ketocarboxylic acids, and alkanolamines. Representative sequestering agents include ethylenediaminetetraacetic acid, diethylenetriaminepentaacetic acid, 1,3-propylenediaminetetraacetic acid, 1,3-diamino-2-propanoltetraacetic acid, ethylenediaminodisuccinic acid and ethylenediaminomonosuccinic acid.

The developing composition can also contain other additives including various development restrainers, development accelerators, swelling control agents and stabilizing agents, each in conventional amounts. Examples of such optional components are described in U.S. Pat. No. 5,236,816 (noted above), U.S. Pat. No. 5,474,879 (Fitterman et al), Japanese Kokai 7-56286 and EP-A-0 585 792.

In the second stage of the process, a fixing composition containing a fixing agent is added to the developing composition to form a combined developing/fixing composition. While sulfite ion sometimes acts as a fixing agent, the fixing agents used in the second stage are not sulfites. Rather, the useful fixing agents are chosen from thiosulfates (including sodium thiosulfate, ammonium thiosulfate, potassium thiosulfate and others readily known in the art), mercapto-substituted compounds (such as those described by Haist, *Modern Photographic Processing*, John Wiley & Sons, N.Y., 1979), thiocyanates (such as sodium thiocyanate, potassium thiocyanate, ammonium thiocyanate and others readily known in the art), amines and halides. Mixtures of one or more of these classes of fixing agents can be used if desired. Thiosulfates and thiocyanates are preferred. In a more preferred embodiment, a mixture of a thiocyanate (such as sodium thiocyanate) and a thiosulfate (such as sodium thiosulfate) is used. In such mixtures, the molar ratio of a thiosulfate to a thiocyanate is from about 1:1 to about 1:10, and preferably from about 1:1 to about 1:2. The sodium salts of the fixing agents are preferred for environmental advantages.

The fixing composition can also include various addenda commonly employed therein, such as buffers, fixing accelerators, sequestering agents, swelling control agents, and stabilizing agents, each in conventional amounts. In its aqueous form, the fixing composition generally has a pH of at least 6, preferably at least 9, and generally less than 11, and preferably less than 12.5.

This combined developing/fixing composition then also contains one or more black-and-white developing agents, sulfites, opacifying agents, one or more non-sulfite fixing agents, and preferably in addition, one or more co-developing agents, one or more sequestering agents, and one or more antifoggants, as described above.

The essential and some optional components described above are present in the aqueous developing and fixing compositions in the general and preferred amounts listed in Table I, all amounts being approximate (that is, "about"). The amounts of each component in the combined developing/fixing composition are shown in the Table I in parentheses ( ). If formulated in dry form, the developing composition would have the essential components in amounts readily apparent to one skilled in the art suitable to provide the desired aqueous concentrations. The optimum amount of opacifying agent useful in the developing composition will vary with the type of opacifying agent(s) used. It is important to find the optimum level for a given opacifying agent(s) so sensitometric properties of the processed elements are not adversely affected. For example, when carbon black is used, sufficient amount must be used to provide the desired absorbance of incident light, but not so much as to coat the processed elements, contributing to undesirable image density. Generally, this amount for carbon black is from about 0.5 to about 1.5 weight %.

TABLE I

| | General Amount | Preferred Amount |
|---|---|---|
| Developing Composition | | |
| Developing agent | 0.1 to 0.5 mol/l | 0.25 to 0.4 mol/l |
| | (0.09 to 0.3 mol/l) | (0.12 to 0.25 mol/l) |
| Co-developing agent | 2 to 40 mmol/l | 2 to 10 mmol/l |
| | (2 to 24 mmol/l) | (2 to 8 mmol/l) |
| Antifoggant | 0 to 2 mmol/l | 0.1 to 1 mmol/l |
| | (0 to 0.5 mmol/l) | (0.1 to 0.5 mmol/l) |
| Sulfite antioxidant | 0.1 to 0.7 mol/l | 0.4 to 0.6 mol/l |
| | (0.1 to 0.4 mol/l) | (0.2 to 0.4 mol/l) |
| Particulate opacifying agent(s) | 0.5 to 5 weight % | 1 to 2 weight % |
| Fixing Composition | | |
| Fixing agent(s) other than sulfite | 0.2 to 8 mol/l | 1.5 to 6 mol/l |
| | (0.2 to 4 mol/l) | (1.5 to 3 mol/l) |
| Sulfite antioxidant | 0 to 0.4 mol/l | 0 to 0.4 mol/l |
| | (0.1 to 0.4 mol/l) | (0.2 to 0.4 mol/l) |

The developing and fixing compositions useful in this invention are prepared by dissolving or dispersing the components in water and adjusting the pH to the desired value using acids or buffers. The compositions can also be provided in concentrated form, and diluted to working strength before or during use. The compositions can be used as their own replenishers, or similar compositions can be used as the replenishers. After the first stage of development, the fixing composition is added to the aqueous developing composition already in the processing container, in either aqueous or dry form.

Processing can be carried out in any suitable processor or processing container for a given type of photographic element. For example, for radiographic films, the method can be carried out using a container or vessel adapted for carrying out both stages of development and development/fixing. Thus, the processor or processing container can be open to roomlight, or enclosed so that roomlight is excluded, but one advantage of this invention is that the processing container or processor need not be light-tight.

In most instances, the processed element is a film sheet. Each element is bathed in the processing compositions for a suitable period of time during each stage.

Development/fixing is preferably, but not essentially, followed by a suitable acidic washing step to stop development, to remove silver salts dissolved by fixing and excess fixing agents, and to reduce swelling in the element. The wash solution can be water, but preferably it is acidic, that is the pH is from about 4.5 to about 7, as provided by a suitable chemical acid or buffer.

After washing, the processed elements may be dried for suitable times and temperatures, but in some instances the black-and-white image may be viewed in a wet condition.

Processing times and conditions for the invention are listed in the following Table II. The total time for the entire processing method can be as low as 35 seconds, and preferably as low as 50 seconds, and as high as 90 seconds, and preferably, as high as 60 seconds.

TABLE II

| PROCESSING STEP | TEMPERATURE (°C.) | TIME (sec) |
| --- | --- | --- |
| Development (first stage) | 15–30 | 5–20 |
| Developing/fixing (second stage) | 15–30 | 10–40 |
| Washing | 15–30 | 5–30 |

The elements processed using the present invention are composed of a conventional flexible, transparent film support (polyester, cellulose acetate or polycarbonate) that has applied to each side one or more photographic silver halide emulsion layers. For radiographic films, it is conventional to use blue-tinted support materials to contribute to the blue-black image tone sought in fully processed films. Polyethylene terephthalate and polyethylene naphthalate are preferred film supports.

In general, such elements, emulsions, and layer compositions are described in many publications, including *Research Disclosure*, publication 36544, Sep. 1994. *Research Disclosure* is a publication of Kenneth Mason Publications, Ltd., Dudley House, 12 North Street, Emsworth, Hampshire PO10 7DQ England.

Preferred silver halide emulsions include silver bromide and silver bromoiodide (having up to 15 mol % silver iodide). Preferred silver halide emulsions include foreharndened tabular grain emulsions as described, for example, in U.S. Pat. No. 4,414,304 (Dickerson et al). These emulsions typically have thin tabular grains of predominantly silver bromide and up to 15 mol % silver iodide, an average thickness of less than about 0.3 $\mu$m, and preferably, up to 3 mol % silver iodide and less than about 0.2 $\mu$m. The grains are usually dispersed in forehardened colloids, such as forehardened gelatin (using a conventional hardener). The emulsions also contain conventional addenda for providing desired coating and sensitometric properties, including but not limited to, sensitizing dyes, infrared opacifying dyes, stabilizers, antifoggants, antikinking agents, surfactants, latent-image stabilizers and other materials known in the art.

In some embodiments, the radiographic films processed according to this invention can also include a thiaalkylene bis(quaternary ammonium) salt in at least one layer, to increase imaging speed by acting as development accelerators. Such elements are described in more detail in U.S. Pat. No. 5,652,086 (Brayer et al).

The silver halide emulsion and other layers in the elements contain conventional hydrophilic colloid vehicles (with or without peptizers or other binders), typically gelatin or gelatin derivatives. Various synthetic polymer peptizers or binders can also be used alone or in combination with gelatin or gelatin derivatives.

Each element has one or more silver halide emulsion layers on each side of the support, and the layers on each side have the same silver halide compositions. Thus, the silver halides in the layers can be the same or different In one embodiment, the radiographic films have two silver halide emulsion layers on both sides of the support, with the layers closest the support containing solely silver bromide grains. The silver coverages on each or both sides of the support can be the same or different. Generally, the total silver coverage on each side is at least about 5 g Ag/m$^2$, and preferably at least about 15 g Ag/m$^2$.

Each side of the element can also include a protective overcoat, or only one side can have an overcoat layer, such a layer containing a hydrophilic colloid material and optionally any other addenda commonly (such as matting agents) used to modify the surface characteristics. The coating coverage of such layers is generally at 0.6 g/m$^2$ of protective colloid, such as a gelatin. Conventional subbing layers can also be included to adhere the silver halide emulsion layers to the support. Other layers, such as interlayers, may be present in the element for conventional purposes, such as providing adhesion. Preferred elements contain an overcoat layer on at least one side of the support.

The total thickness of the coated layers on either or both sides of the elements can be at least 3 $\mu$m, and preferably at least 4 $\mu$m. The thickness is generally less than 7 $\mu$m, and preferably less than 6 $\mu$m.

As noted above, preferred elements processed using this invention contain one or more particulate dyes and/or one or more desensitizers to provide roomlight handleability. Such materials are thus useful if they absorb all incident electromagnetic radiation at from about 350 to about 550 nm.

Advantageously, the elements contain one or more particulate dyes described above that absorb electromagnetic radiation in the visible and UV regions of the spectrum. These dyes are usually placed in the overcoat layer(s), but they can be in more than one location as long as they are readily decomposed during fixing.

Such particulate dyes generally have a size to facilitate coating and rapid decolorization during processing. In general, the smaller particles are best for these purposes, that is those having a mean diameter of less than 10 $\mu$m, and preferably less than 1 $\mu$m. The particulate dyes are most conveniently formed by crystallization from solution in sizes ranging down to 0.01 $\mu$m or less. Conventional techniques can be used to prepare dyes of the desired size, including ball milling, roller milling and sand milling.

An important criterion is that such dyes remain in particulate form in hydrophilic colloid layers of photographic elements. Various hydrophilic colloids can be used, as would be appreciated by a skilled worker in the art, including those mentioned herein for various layers. Where the particulate dyes are placed in overcoat layers, the particulate dyes are generally the only component besides the binder material.

Classes of useful particulate dyes include, but are not limited to, nonionic classes of compounds such as nonionic polymethine dyes, which include the merocyanine, oxonol, hemioxonol, styryl and arylidene dyes. Anionic dyes of the cyanine class may also be useful as long as they have the desired coatability properties (soluble at pH 5 to 6 and 40° C.) and remain in particulate form after coating. Some useful particulate dyes are described, for example, in U.S. Pat. No. 4,803,150 (Dickerson et al), incorporated herein by reference.

The useful amount of particulate dye in the elements is at least 0.5 g/m$^2$ on each side of the support, and preferably at least 0.7 g/m$^2$. Generally, the upper limit of such materials is 2 g/m$^2$, and preferably, less than 1.5 g/m$^2$ is used. Mixtures of particulate dyes can be used in one or more layers of the element.

The elements processed according to this invention also include one or more "desensitizers" in a silver halide emulsion layer(s) in order to provide additional visible and UV light protection. Conventional desensitizers can be used, as are known in photography and radiography. Various desensitizers are described, for example, in *Research Disclosure*, Vol. 308, December 1989, publication 308119, Section III, the disclosure of which is incorporated herein by reference. Classes of such compounds include azomethine dyes (such as those described in U.S. Pat. No. 3,630,744 of Thiers et al).

Generally, the amount of desensitizer relative to the amount of silver halide in the element is adapted according to the particular silver halide emulsion used in the element, the particular desensitizer used, the ratio of gelatin or other colloid binder to silver halide, other components of the emulsions, and the procedure for preparing the emulsions. All of these factors would be well known to one skilled as a maker of silver halide emulsions. Thus, the amount should be effective to provide for a reduction in visible and UV light sensitivity, but no reduction in sensitivity to X-radiation.

More particularly, the useful amount of desensitizer in the elements is at least 1.5 mg/m$^2$ on each side of the support, and preferably at least 1.7 mg/m$^2$. Generally, the upper limit of such materials is 4 mg/m$^2$, and preferably, less than 3 mg/m$^2$ is used. Mixtures of desensitizers can be used in one or more layers of the element.

Advantageously, the processing method of this invention can be carried out using a processing kit that includes some or all of the components necessary for using the method. Minimally, the processing kit would include the black-and-white developing composition described herein, packaged in a suitable manner. In addition, the kit would include any one or more of the other necessary components, such as the fixing composition described herein, acidic wash described herein, one or more samples of a photographic element described herein, a suitable processing container, instructions for use, fluid or composition metering devices, or any other conventional components of a photographic processing kit. All of the components can be suitably packaged in dry or liquid form in glass or plastic bottles, fluid-impermeable packets or vials. For use to process dental films, the kit would typically include one or more ready-to-use dental film samples or packets.

The following examples are provided for illustrative purposes, and not to be limiting in any manner.

MATERIALS AND METHODS FOR EXAMPLES:

A radiographic Film was prepared having the following layer arrangement and composition:

| | | |
|---|---|---|
| Overcoat Layer | Gelatin | 1.35 g/m$^2$ |
| | Dye I* | 0.48 g/m$^2$ |
| | Dye II** | 0.16 g/m$^2$ |
| Emulsion Layer | AgBr Emulsion (tabular grains 2.0 μm by 0.13 μm) | 7.56 g Ag/m$^2$ |
| | Gelatin | 4.92 g/m$^2$ |
| | Dye I* | 0.16 g/m$^2$ |
| | Dye II** | 0.11 g/m$^2$ |
| | 6-chloro-4-nitrobenzotriazole | 2.1 mg/m$^2$ |
| Support | Polyethylene terephthalate | |
| Emulsion Layer | AgBr Emulsion (tabular grains 1.3 μm by 0.13 μm, average) | 7.56 g Ag/m$^2$ |
| | Gelatin | 4.92 g/m$^2$ |
| | Dye I* | 0.16 g/m$^2$ |
| | Dye II** | 0.11 g/m$^2$ |
| | 6-chloro-4-nitrobenzotriazole | 2.1 mg/m$^2$ |
| Overcoat Layer | Gelatin | 1.35 g/m$^2$ |
| | Dye I* | 0.48 g/m$^2$ |
| | Dye II** | 0.16 g/m$^2$ |

Dye I* is bis[1-(4-carboxyphenyl)-3-methyl-2-pyrazolin-5-one-4] monomethineoxonol.
Dye II** is 4-(4-dimethylaminobenzylidene)-1-(4-carboxyphenyl)-3-methyl-2-pyrazolin-5-one.

EXAMPLE

The following black-and-white processing compositions I-V in Table III were prepared and used in the processing methods described below.

Compositions I and IV were solely developing compositions, Composition II was solely a fixing composition, and Compositions III and V were combined developing/fixing composition provided when the developing (I or IV) and fixing composition (II) were combined in a second stage of processing.

TABLE III

| COMPONENT | I(mmol/l) | II(mmol/l) | III(mmol/l) | IV(mmol/l) | V(mmol/l) |
|---|---|---|---|---|---|
| Potassium sulfite | 530 | 0 | 265 | 530 | 265 |
| Carbon black (weight %) | 1% | 0 | 1% | 0 | 0 |
| 4-Hydroxymethyl-4-methyl-1-phenyl-3-pyrazolidone | 4.8 | 0 | 2.4 | 4.8 | 2.4 |
| Hydroquinone | 364 | 0 | 182 | 364 | 182 |
| 5-Methylbenzotriazole | 0.45 | 0 | 0.225 | 0.45 | 0.225 |
| Sodium thiocyanate | 0 | 3950 | 1975 | 0 | 1975 |
| Sodium thiosulfate | 0 | 1520 | 760 | 0 | 760 |
| Potassium hydroxide | 710 | 0 | 355 | 710 | 355 |
| Carbowax 1450 | 0.5 g/l | 0 | 0.25 g/l | 0.5 g/l | 0.25 g/l |
| Borax | 13 | 0 | 6.5 | 13 | 6.5 |
| Benzyl alcohol | 6 | 0 | 3 | 6 | 3 |
| pH | 12.3 | — | 11.8 | 12.3 | 11.8 |

Samples of the radiographic film described above were exposed to roomlight (500 Lux fluorescent lighting) for 60 seconds, and hand processed using the various processing compositions noted above at room temperature and in roomlight using the following processing protocol. The washing solution was an aqueous solution buffered to a pH of about 4.5.

The film samples were then evaluated for various sensitometric properties using conventional sensitometry. The processing protocol and results are shown in the following Table IV.

TABLE IV

| | COMPOSITIONS (Conditions) | DEVELOPMENT TIME (1st Stage, seconds) | FIXING TIME (seconds) | 2nd STAGE (seconds) | Dmin Difference | SPEED | DYNAMIC RANGE |
|---|---|---|---|---|---|---|---|
| Control A | V and II (safe light) | 30 | 30 | 0 | 0.37 | 246 | 6.18 |
| Control B | V and II (room light) | 30 | 30 | 0 | 4.66 | 217 | 1.89 |
| Control C | I and II (room light) | 30 | 30 | 0 | 2.36 | 216 | 3.59 |
| Invention | I and II (room light) | 20 | 0 | 40 | 0.80 | 251 | 5.75 |
| Control D | IV and IV (safe light) | 20 | 0 | 40 | 0.64 | 251 | 5.91 |
| Control E | IV and V (room light) | 20 | 0 | 40 | 6.18 | — | 0 |

"Speed" and "Dynamic Range" have conventional meanings. "Dmin Difference" refers to an increase in Dmin due to roomlight exposure.

The first three processes listed in Table IV were carried out using conventional two-step protocols (development, then fixing) in separate processing baths, with (Control C) and without carbon black (Controls A and B) in the developing composition. Controls D and E demonstrate the effect of a two-stage process in which carbon black was omitted from the developing composition. In Control D, processing was carried out in a safe light environment, but Control E was carried out in room light.

The results in Table IV indicate that it is possible to rapidly process radiographic films under roomlight conditions in a simple two-stage process using Compositions I and III for the individual stages (of course, Composition II is added to Composition I to make Composition III). The sensitometric results are comparable to the conventional method using two separate steps of development and fixing under safe light conditions (Control A), and to the two-stage process carried out under safe light conditions (Control D).

Moreover the invention provided an improvement in speed, dynamic range and reduced fog over the use of a conventional two step process in which carbon black was included in the developing composition (Control C). The film was completely fogged in Control E, and high fog, lower speed and poor dynamic range were observed in Control B.

The invention has been described in detail with particular reference to preferred embodiments thereof, but it will be understood that variations and modifications can be effected within the spirit and scope of the invention.

We claim:

1. A black-and-white developing composition comprising:
    from about 0.1 to about 0.5 mol/l of a black-and-white developing agent,
    at least 0.5 weight % of a particulate opacifying agent, and
    from about 0.1 to about 0.7 mol/l of a sulfite.

2. The composition of claim 1 wherein said composition is in aqueous form, and has pH of from about 10 to about 12.5.

3. The composition of claim 2 wherein said composition has a pH of from about 10.5 to about 12.

4. The composition of claim 1 comprising from about 0.25 to about 0.4 mol/l of said black-and-white developing agent.

5. The composition of claim 1 comprising from about 0.4 to about 0.6 mol/l of said sulfite.

6. The composition of claim 1 further comprising from about 2 to about 40 mmol/l of a co-developing agent.

7. The composition of claim 1 further comprising from about 0 to about 2 mmol/l of an antifoggant.

8. The composition of claim 1 wherein said particulate opacifying agent is carbon black.

9. The composition of claim 1 wherein said particulate opacifying agent is present in an amount of from about 0.5 to about 5 weight %.

10. The composition of claim 1 wherein said particulate opacifying agent is carbon black present in an amount of from about 0.5 to about 1.5 weight %.

11. A processing kit comprising:
    a) a black-and-white developing composition comprising:
        from about 0.1 to about 0.5 mol/l of a black-and-white developing agent,
        at least 0.5 weight % of a particulate opacifying agent, and
        from about 0.1 to about 0.7 mol/l of a sulfite, and
    b) one or more of the components selected from:
        a fixing composition comprising a fixing agent other than a sulfite,
        a processing container, and
        a black-and-white photographic silver halide element comprising a support having thereon one or more layers, at least one of said layers being a silver halide emulsion layer, said element further comprising:
            in one of said layers, a microcrystalline particulate dye that absorbs electromagnetic radiation in the visible and UV portions of the spectrum and is decolorized with a sulfite, and
            in each silver halide emulsion layer, a desensitizer that reduces sensitivity of the silver halide emulsion layer to electromagnetic radiation in the visible portion of the spectrum by trapping electrons generated by exposure to that electromagnetic radiation.

12. The processing kit of claim 11 wherein said particulate opacifying agent is carbon black, and said processing kit includes each of the named b) components.

13. The processing kit of claim 11 wherein said black-and-white developing composition is in aqueous form, and has pH of from about 10 to about 12.5.

14. The processing kit of claim 13 wherein said black-and-white developing composition has a pH of from about 10.5 to about 12.

15. The processing kit of claim 11 wherein said black-and-white developing composition comprises from about 0.25 to about 0.4 mol/l of said black-and-white developing agent.

16. The processing kit of claim 11 wherein said black-and-white developing composition comprises from about 0.4 to about 0.6 mol/l of said sulfite.

17. The processing kit of claim 11 wherein said black-and-white developing composition further comprises from about 2 to about 40 mmol/l of a co-developing agent.

18. The processing kit of claim 11 wherein said black-and-white developing composition further comprises from about 0 to about 2 mmol/l of an antifoggant.

19. The processing kit of claim 11 wherein said particulate opacifying agent is carbon black that is present in said black-and-white developing composition in an amount of from about 0.5 to about 5 weight %.

20. The processing kit of claim 19 wherein said particulate opacifying agent is present in said black-and-white developing composition in an amount of from about 0.5 to about 1.5 weight %.

21. The processing kit of claim 11 wherein said silver halide element further comprises:
   in one of said layers, a microcrystalline particulate dye that absorbs electromagnetic radiation in the visible and UV portions of the spectrum and is decolorized during step B, and
   in each silver halide emulsion layer, a desensitizer that reduces sensitivity of the silver halide emulsion layer to electromagnetic radiation in the visible portion of the spectrum by trapping electrons generated by exposure to that electromagnetic radiation.

22. The processing kit of claim 21 wherein said silver halide element is a radiographic element having a film support and a silver halide emulsion layer on both sides of said support, said particulate dye is a nonionic polymethine dye present in said element in an amount of from about 0.5 to about 2 $g/m^2$, and said desensitizer is an azomethine dye present in said element in an amount of from about 1.5 to about 4 $mg/m^2$.

23. The processing kit of claim 11 wherein said silver halide element comprises on each side of said support, a silver halide emulsion layer comprising forehardened silver halide tabular grains comprising at least 85 mol % silver bromide.

24. The processing kit of claim 21 wherein said silver halide element further comprises an overcoat layer on both sides of said support, and said particulate dye is located in at least one of said overcoat layers.

* * * * *